(12) United States Patent
Kolharkar et al.

(10) Patent No.: US 9,327,952 B1
(45) Date of Patent: May 3, 2016

(54) CART FOR MOVING ITEMS

(75) Inventors: Mangesh S. Kolharkar, Bothell, WA (US); David L. Mangold, Hilliard, OH (US)

(73) Assignee: Amazon Technologies, Inc., Reno, NV (US)

( * ) Notice: Subject to any disclaimer, the term of this patent is extended or adjusted under 35 U.S.C. 154(b) by 1153 days.

(21) Appl. No.: 13/294,122

(22) Filed: Nov. 10, 2011

(51) Int. Cl.
*B66F 9/12* (2006.01)
*B65G 1/04* (2006.01)

(52) U.S. Cl.
CPC .............. *B66F 9/127* (2013.01); *B65G 1/0435* (2013.01)

(58) Field of Classification Search
CPC ......... B66F 9/127; B66F 9/07; B65G 1/0407; B65G 1/0435
USPC .......................................... 414/608, 529, 536
See application file for complete search history.

(56) References Cited

U.S. PATENT DOCUMENTS

| | | | | |
|---|---|---|---|---|
| 2,709,532 A | * | 5/1955 | Marietta | 414/661 |
| 3,429,403 A | * | 2/1969 | Drechsler et al. | 186/63 |
| 4,492,504 A | * | 1/1985 | Hainsworth | 414/273 |
| 4,756,660 A | * | 7/1988 | Cesarini | 414/536 |
| 4,787,808 A | * | 11/1988 | Shimoji et al. | 414/531 |
| 5,096,018 A | * | 3/1992 | Dickinson, Jr. | 182/69.6 |
| 5,123,517 A | * | 6/1992 | Windau | 198/463.3 |
| 5,478,189 A | * | 12/1995 | Agtuca | 414/529 |
| 5,779,428 A | * | 7/1998 | Dyson et al. | 414/536 |
| 5,846,043 A | * | 12/1998 | Spath | 414/343 |
| 7,516,855 B2 | | 4/2009 | Konstant | |
| 8,019,463 B2 | | 9/2011 | Peck | |
| 2004/0197172 A1 | * | 10/2004 | Hansl et al. | 414/281 |
| 2005/0079039 A1 | * | 4/2005 | Neumann et al. | 414/529 |
| 2005/0220600 A1 | | 10/2005 | Baker et al. | |
| 2007/0151940 A1 | * | 7/2007 | Skinner et al. | 212/312 |
| 2010/0129184 A1 | * | 5/2010 | Thogersen | 414/467 |

* cited by examiner

*Primary Examiner* — Jonathan Snelting (74) *Attorney, Agent, or Firm* — Robert C. Kowert; Meyertons, Hood, Kivlin, Kowert & Goetzel, P.C.

(57) ABSTRACT

A cart for moving items includes a base, wheels coupled to the base, and one or more rollers coupled on an upper surface of the base. The base includes one or more loading areas for loading items to be moved onto the base, and one or more unloading areas for unloading items from the base. The rollers coupled on one or more upper surfaces of the base in the loading areas may support items as the items are loaded onto the base.

29 Claims, 8 Drawing Sheets

CART FOR MOVING ITEMS

BACKGROUND

Electronic marketplaces (e.g., Internet- or web-based marketplaces) have become legitimate alternatives to traditional "brick and mortar" retail stores. For instance, consumers may visit a merchant's website to view and/or purchase goods and services offered for sale by the merchant (and/or third party merchants). In many cases, consumers appreciate the convenience and simplicity of the shopping experience provided by electronic marketplaces. For example, a consumer may quickly browse an electronic catalog (e.g., via a web browser) and select one or more items from the catalog for purchase. Such items may be shipped directly to the consumer thereby relieving the consumer of the inconvenience of traveling to a physical store.

Some electronic marketplaces include large electronic catalogs of items offered for sale. Distributors that operate such marketplaces may process inventory of items in one or more facilities (e.g., warehouses, distributions centers, etc.). Some product sellers have facilities in only a relatively small number of locations. Shipping from the small number to myriad domestic and foreign locations of customers requires that many items be shipped long distances.

In some fulfillment centers, large inventory items, such a flat screen televisions, barbeque grills, and weight sets, are moved using machines or power equipment such as fork lifts. Moving an item using machines or power equipment may in some cases cause damage to an item or its packaging. For example, a box of a flat screen television may be damaged when a fork lift is inserted under the box.

In some cases, damage to an item or its packaging can be avoided by manually moving the item instead of using machines. Nevertheless, for large items, such as large flat screen televisions, it may be necessary to have a team of persons lift and transport the item. Having two or more persons instead of one person involved in picking and moving an item tends to increase the labor and expense associated with fulfilling orders from inventory.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of systems and methods for moving items are disclosed. According to one embodiment, a cart for moving items includes a base, wheels coupled to the base, and rollers coupled on an upper surface of the base. The base includes one or more loading areas for loading items to be moved onto the base and one or more unloading areas for unloading items from the base. Rollers coupled on one or more upper surfaces of the base in the loading areas may support items as the items are loaded onto the base. In some embodiments, the cart includes fork pockets coupled to the base. The fork pockets may be used with an order picker. In some embodiments, a system includes one or more tugger attachments (for example, on the front and the back of the cart).

According to one embodiment, a system for managing inventory of physical items includes a cart having a base having one or more loading/unloading areas for loading or unloading items to be moved. Rollers are coupled on an upper surface of the base in at least one of the loading/unloading areas. The rollers support items as the items are loaded onto the base or unloaded from the base. In some embodiments, the system includes a motorized system, such as an order picker, for moving the cart from one place to another. In certain embodiments, the system includes a walkie or automatic guided vehicle ("AGV"). The walkie or AGV may be used to move the cart from place to place.

According to one embodiment, a method of managing inventory includes loading items onto a loading area of a cart. During loading, the items being loaded are moved across rollers on an upper surface of the cart. The items are moved from a loading area of the cart to an unloading area of the cart. The cart is moved from a loading site to an unloading site. The items are unloaded from the unloading area of the cart.

According to one embodiment, a method of transferring an item between a cart and a platform includes rolling a first portion of the item on one or more cart rollers on the cart. While the first portion of the item is rolled on the cart rollers, a second portion of the item is rolled on one or more platform rollers on the platform. During at least a portion of the move between the cart and the platform, the item is supported by both the cart rollers and the platform rollers.

As used herein, "base" means an element or combination of elements on which other elements can be placed or mounted. A base may have any shape, including rectangular, square, ovate, circular, or irregular. A base may have any suitable construction, such as one or more plates, frames, rails, channels, platforms, grids, or combinations thereof. A base may include any number of upper surfaces on which elements can be placed or attached. In some embodiments, a base includes moving elements such as rollers mounted to one or more fixed base members.

As used herein, "cart" means an element or combination of elements on which items can be placed and transported from one place to another. A cart may have wheels, treads, or other elements to facilitate movement of the cart from one place to another.

As used herein, a "track" means an element or combination of elements that form a path over which an item can be moved. Elements that may form a track include rails, rollers, belts, or combinations thereof. A path created by a track may be linear, non-linear (for example, curved), or a combination thereof. In one embodiment, a track is formed by a series of rollers attached to a fixed base.

As used herein, "area" means an area, zone, or region of an item. An "area" does not require specific boundaries or dimensions. For example, a loading area may be a portion of a cart in which items can be loaded. In addition, different areas may overlap or coincide. For example, a loading area and an unloading area on a cart may be the same area or may overlap with one another. As another example, a holding area and an unloading area on a cart may be the same area or overlap with one another.

As used herein, "coupled to" includes a direct connection or an indirect connection. Elements may be coupled to one another in any of various manners, including a fixed connection, pivoting connection, sliding connections, or combinations thereof.

As used herein, "lateral" or "laterally" includes in a lateral direction or a generally horizontal direction.

As used herein, "shelves" or "shelving" includes any system, element, or combination thereof that has one or more shelves, platforms, or other surfaces for holding items.

As used herein, a "space" means a space, area or volume.

As used herein, "tier" means a row or level of one or more objects. A tier may be part of an arrangement or assembly of objects. Objects in one tier may be above or below items in one or more other tiers of objects within an arrangement.

In various embodiments, a wheeled cart is provided for moving items. The cart may have one or more loading areas for loading items and one or more unloading areas for unloading the items. Rollers are provided on the upper surface of the cart to support items as they are loaded onto the cart or unloaded from the cart.

A cart may be used for moving any physical item. In some embodiments, the packaging for items, or the items themselves, have a box shape. In some embodiments, the items may be relatively large and/or relatively heavy items. For example, cart may hold shipping boxes whose length is greater than 18 inches and weighs more than 50 pounds. Examples of items that may be transported on a cart include television sets, barbeque grills, unassembled furniture kits (such as bookshelves), and sports equipment (such as a basketball goal or a weight set).

Figure 1:
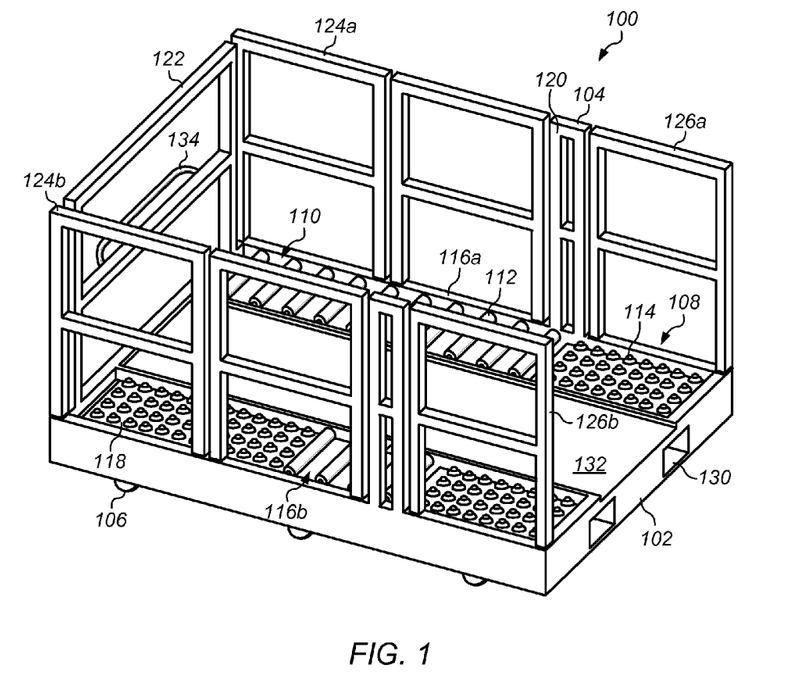
FIG. 1 illustrates one embodiment of cart for moving items including rollers on upper surfaces of the cart.

FIG. 1 illustrates one embodiment of cart for moving items having rollers on upper surfaces of the cart. Cart 100 includes base 102, rail system 104, and wheels 106. Rail system 104 is attached to base 102. Wheels 106 may be used to roll cart 100 from place to place on a floor. In some embodiments, wheels 106 are mounted on casters. Cart 100 may be moved in any direction on a floor.

Cart 100 includes loading area 108 and holding area 110. In some embodiments, items are loaded onto cart 100 in loading area 108 and items are accumulated on cart 100 in holding area 110. In the embodiment shown in FIG. 1, all or part of holding area 110 may serve as an unloading area from which items can be unloaded from cart 100.

Cart 100 includes loading area rollers 114 on base 102 in loading area 108. In some embodiments, rollers 114 are ball transfer devices. Ball transfer devices may, for example, include spherical rollers that roll in any direction relative to a fixed mount secured to base 100. In some embodiments, rollers 114 are ball transfer devices that include bearings for reducing friction between rolling elements and a fixed mount. An item placed on rollers 114 may move in any horizontal direction on rollers 114 (left to right, front to back, or any combination thereof), with rollers 114 rolling underneath the item as the item is translated horizontally relative to base 100.

Cart 100 includes rollers 112 between loading area 108 and holding area 110. Rollers 112 may roll relative to base 100. In some embodiments, rollers 112 are cylindrical rollers. Rollers 112 may form roller track 116a and roller track 116b on either side of cart 100. Roller track 116a may be parallel to, and spaced from, roller track 116b.

Rollers 118 are provided at the end of roller track 116b. Rollers 118 may roll relative to base 100. In some embodiments, rollers 118 are ball transfer devices. Rollers 118 may be used to aid in removing items from cart 100.

Although in the embodiment shown in FIG. 1, cart 100 includes a combination of spherical rollers and cylindrical rollers, a cart may in various embodiments include only spherical rollers or only cylindrical rollers.

Rail system 104 includes side rails 120 and end rail 122. Side rails 120 may inhibit items from coming off of base 100 along the sides of cart 100. End rail 122 may inhibit items from coming off of base 100 at the holding area-end of cart 100.

Side rails 120 include unload doors 124a and 124b and loading area doors 126a and 126b. Unload door 124a or unload door 124b may be opened to allow items to be removed from holding area 110. Loading area door 126a or loading area door 126b may be opened to allow items to be introduced on the sides of cart 100 at loading area 108. Unload doors 124a and 124b and loading area doors 126a and 126b may be attached to side rails 120 and end rail 122 by way of hinges.

In some embodiments, the width of base 102 between side rails is about the same as the width of the items to be held on cart 100.

Cart 100 includes fork sockets 130. Fork sockets 130 may each receive a tine of a fork of an order picker, fork lift, or other lift machine.

Cart 100 includes walkway 132. Walkway 132 may provide a location for loading personnel to stand while items are being loaded, unloaded, or repositioned on cart 100. In the embodiment shown in FIG. 1, walkway 132 is between two sets of roller tracks, a walkway may be located anywhere on a cart. For example, a walkway may be located to on one side of a cart between a side rail and one or more sets of roller tracks. In certain embodiments, walkway 132 may be omitted.

Cart 100 includes handle 134. Handle 134 may be used by personnel to push or pull cart 100 from one location to another on wheels 106.

Figure 2:
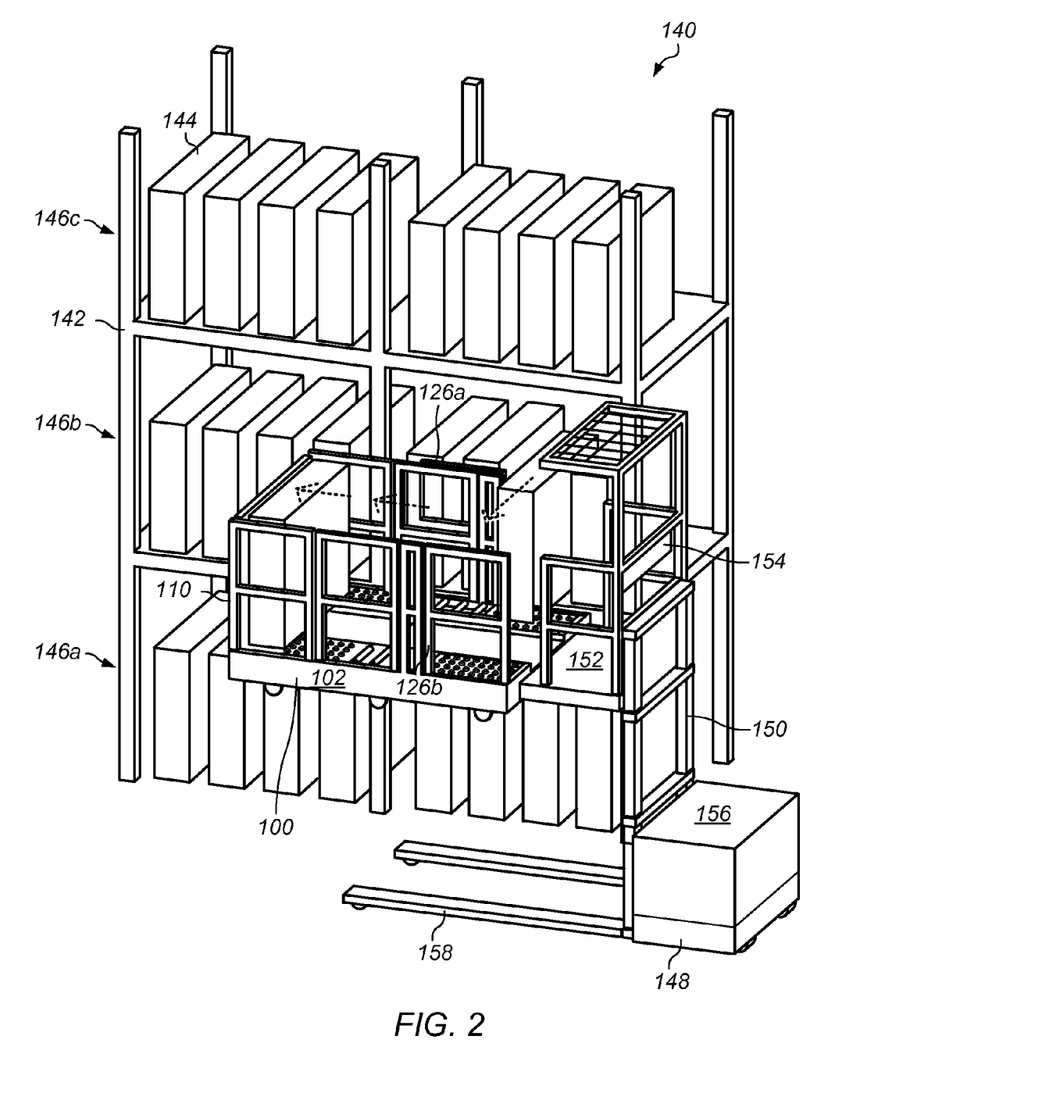
FIG. 2 illustrates one embodiment of a cart mounted on an order picker that can be used to pick and stow televisions and other bulky items from a storage rack and move the picked televisions to another location.

In some embodiments, a cart with upper surface rollers is used in conjunction with a lift machine, such as an order picker. FIG. 2 illustrates one embodiment of a cart mounted on an order picker that can be used to pick televisions and other bulky items from a storage rack and move the picked televisions to another location.

System 140 includes storage rack 142. Storage rack 142 holds television boxes 144. Storage rack 142 includes levels 146a, 146b, and 146c.

System 140 includes cart 100 mounted on order picker 148. Order picker 148 includes column 150, platform 152, control panel 154, and drive system 156. The height of platform 152 may be adjustable, for example, so that platform 152 may be raised and lowered to any of levels 146a, 146b, or 146c. In one embodiment, cart 100 is mounted on a fork extending from platform 152. Control panel 154 may be operated from platform 152 to raise or lower platform 152, to move order picker 148 from one location to another on the floor of the facility, or both. Outriggers 158 may counteract cantilevered loads of cart 100 on order picker 148 and provide stability to order picker 148.

To load television boxes 144 onto cart 100, door 126a may be placed in an open position. Box 144 may be pulled from storage rack 144 onto loading area rollers 114 in loading area 108 of cart 100. Loading area rollers 114 may roll as box 144 is translated away from storage rack 144 and across the width of cart 100. Box 144 may continue to be pulled away from storage rack 142 until box 144 is entirely on cart 100. Door 126b may inhibit box 144 from being inadvertently pulled off the back side of cart 100.

In some embodiments, a storage rack levels are selected based on the height of the items to be stowed. For example, the spacing between tiers in a storage rack may be sized to match the height of television boxes 144 (for example, to maximize utilization of storage space). In certain embodiments, different sections of a storage rack may be sized for different items to be stored. In certain embodiments, dimensions of a cart may be chosen to correspond with surfaces on a storage rack. For example, a cart may be sized such that the upper surface of the cart is at the same level as a shelf of the storage rack.

Once box 144 is entirely on cart 100, box 144 may be pushed toward holding end 110 of cart 100. Box 144 may travel over rollers 112 of roller tracks 116A and 116B. Rollers 112 may facilitate transfer of box 144 across base 100. An operator may exit lift platform 152 and step onto walkway 132 to improve toe operator's position for pushing box 144 to a desired location on base 100. The operator may move from location to location on storage rack 142 and load additional boxes 144 onto cart 100. Boxes 144 may be accumulated on base 102 in a horizontal row.

Figure 3:
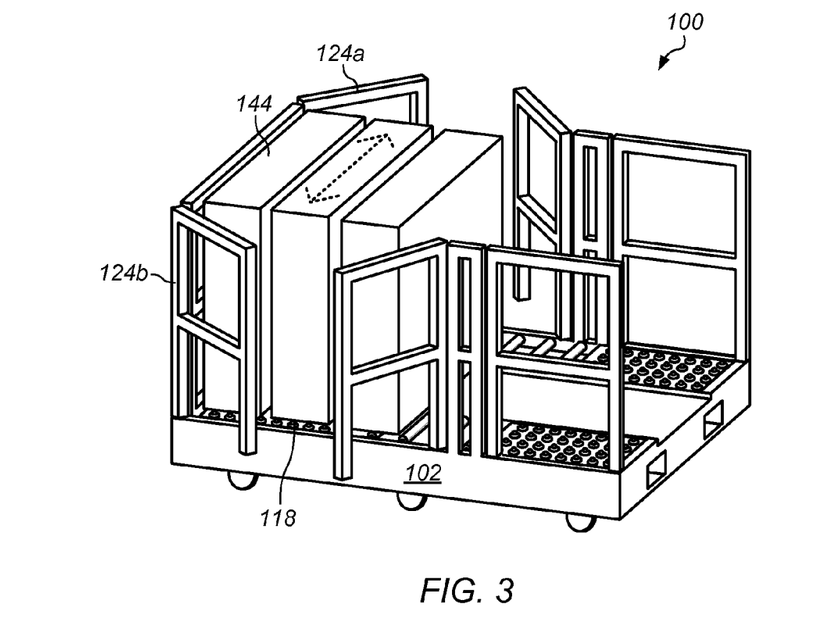
FIG. 3 illustrates an embodiment of a cart with accumulated items arranged in a row.

FIG. 3 illustrates an embodiment of a cart with accumulated items arranged in a row. Television boxes 144 are positioned in a row in loading area 108. The leftmost television box 144 may contact end rail 122. In FIG. 3, doors 124a and 124b are shown as partially swung open for illustrative purposes. As indicated by the arrows, television boxes 144 may be removed from cart 100 in either direction.

Figure 4:
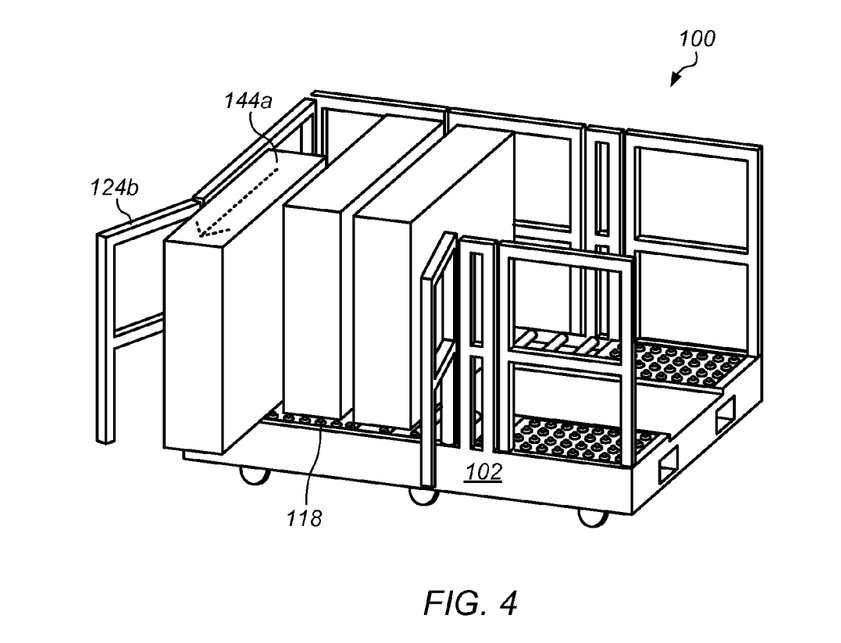
FIG. 4 illustrates an embodiment of removing an item from a cart.

FIG. 4 illustrates an embodiment of removing an item from a cart. Box 144a may be removed from cart 100. As box 144a is moved across base 102 and through open doors 124b, rollers 118 may roll relative to base 102. Rollers 118 may facilitate removal of box 144a from cart 100.

In some embodiments, an item is moved to or from a cart by roller-to-roller transfer. In one embodiment, a cart is positioned so that rollers on the cart are co-planar with rollers on a platform from which an item is to be loaded.

Figure 5:
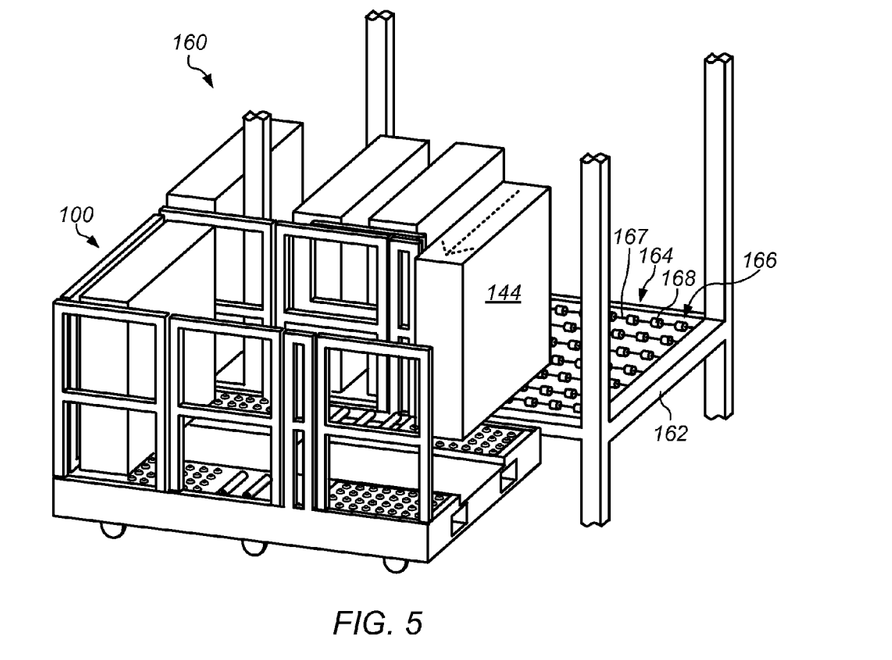
FIG. 5 illustrates one embodiment of roller-to-roller transfer of an item onto a cart from a storage rack.

FIG. 5 illustrates one embodiment of roller-to-roller transfer of items onto a cart from a storage rack. System 160 includes storage rack 162, cart 100. Storage rack 162 includes shelf 164. Shelf 164 includes roller assemblies 166. Roller assemblies 166 include rods 167 and rollers 168. Cart 100 may be raised to the level of shelf 164, for example, by a lifting apparatus such as an order picker (the lifting apparatus is omitted for clarity). As one of television boxes 144 is moved from shelf 164 to cart 100, the leading portion of the television box may move across rollers 114 in loading area 108 of cart 100. At the same time, the trailing portion of the television box may move across rollers 168 on shelf 164. In some embodiment, only one person may be involved in moving the box from storage rack 162 to cart 100.

Figure 6:
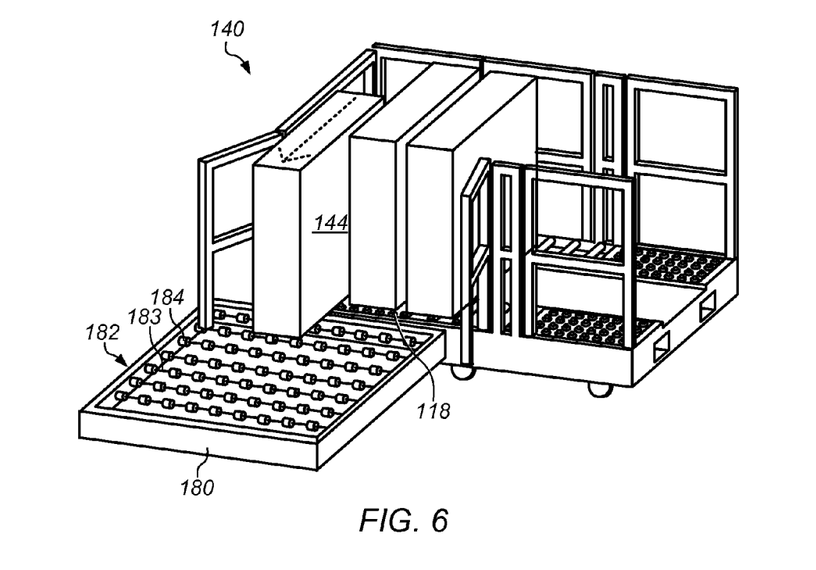
FIG. 6 illustrates one embodiment of roller-to-roller transfer of an item from a cart to a processing platform.

In some embodiments, a cart is positioned so that rollers on the cart are co-planar with rollers on a platform from to which an item is to be unloaded. FIG. 6 illustrates one embodiment of roller-to-roller transfer of items from a cart to a platform. Processing platform 180 includes roller assemblies 182. Roller assemblies 182 include rods 183 and rollers 184. Cart 100 may be placed into position relative to processing platform 180 such that rollers 118 are at the same level as rollers 184. As one of television boxes 144 is moved from cart 100 to processing platform 180, the leading portion of the television box may move across rollers 184 of processing platform. At the same time, the trailing portion of the television box may move across rollers 118 on cart 100. In some embodiments, only one person may be involved in moving the box from cart 100 to processing platform 180.

Although in the embodiment shown in FIG. 1, cart 100 includes retaining elements in the form of rails, a cart may in various embodiments have other types of retaining elements or structures. Examples of other retaining elements include walls, panels, screens, vertical posts, cables, rods, or bars, and combinations thereof.

Figure 7:
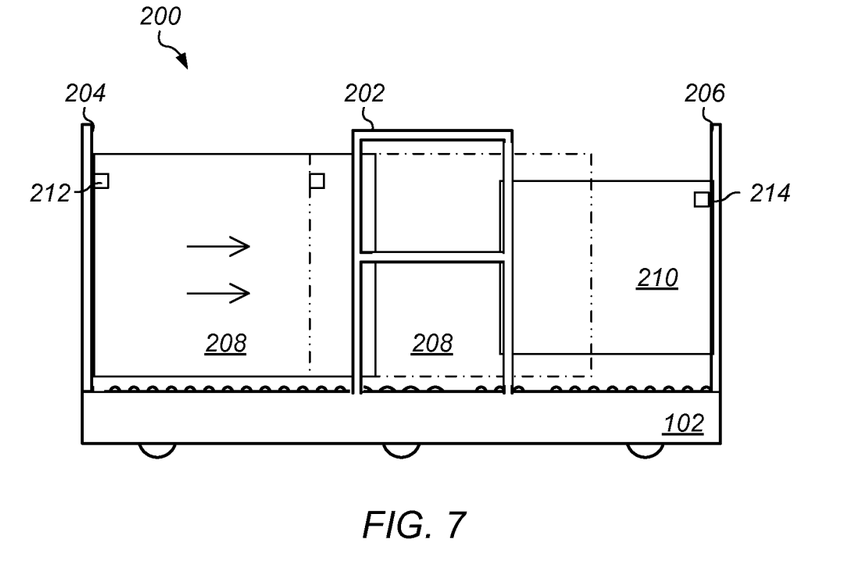
FIG. 7 illustrates an embodiment of a cart including retaining door panels that slide between open and closed positions.

In some embodiments, retaining elements of a cart may be opened and closed without going extending or enlarging the footprint of the cart. FIG. 7 illustrates an embodiment of a cart including retaining door panels that slide between open and closed positions. Cart 200 includes base 102, side rail 202, unload doorpost 204, and load door post 206. Unload area door 208 and load area door 210 are mounted on side rail 202. Each of unload area door 208 and load area door 210 can slide between an open position and a closed position on side rail 202. For example, unload area door 208 can be slid from a closed condition against unload door post 204 and an open position represented by the phantom lines.

In various embodiments, retaining elements include devices for securing retaining elements in position. For example, as shown in FIG. 7, unload area door 208 includes latch 212 and load area door 210 includes latch 214. Latch 212 may couple to unload door post 204. Latch 214 may couple to load door post 206.

Although for illustrative purposes only one side of cart 200 is shown in FIG. 7, both sides of cart 200 may have a sliding door arrangement similar to that shown in FIG. 7.

Figure 8:
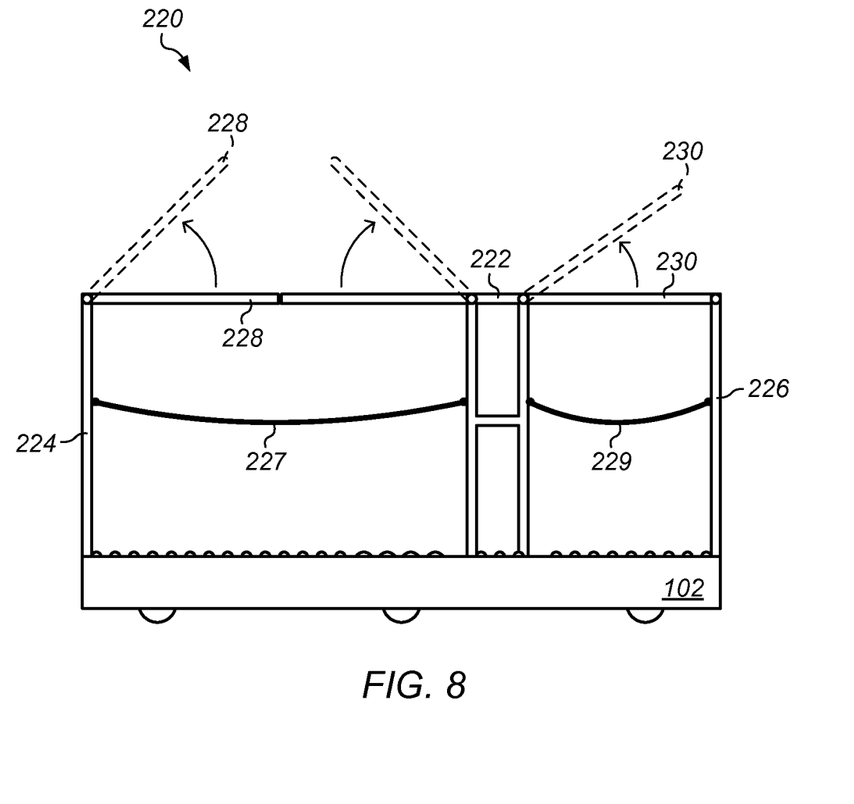
FIG. 8 illustrates an embodiment of a cart including retaining bars.

FIG. 8 illustrates an embodiment of a cart including retaining bars. Cart 220 includes base 102, side rail 222, unload end post 224, and load end post 226. Chain 227 may be attached to unload end post 224 and side rail 222. Chain 229 may be attached to load end post 226 and side rail 222. Retaining bars 228 may be pinned to side rails 222 and unload end post 224. Retaining bar 230 may be pinned to side rail 222. Retaining bars 228 and 230 may be swung upwardly, and chains 227 and 229 may be detached as needed to allow items to be loaded or unloaded on the sides of cart 220.

Although for illustrative purposes only one side of cart 220 is shown in FIG. 8, both sides of cart 220 may have a retaining bar arrangement similar to that shown in FIG. 8.

Figure 9:
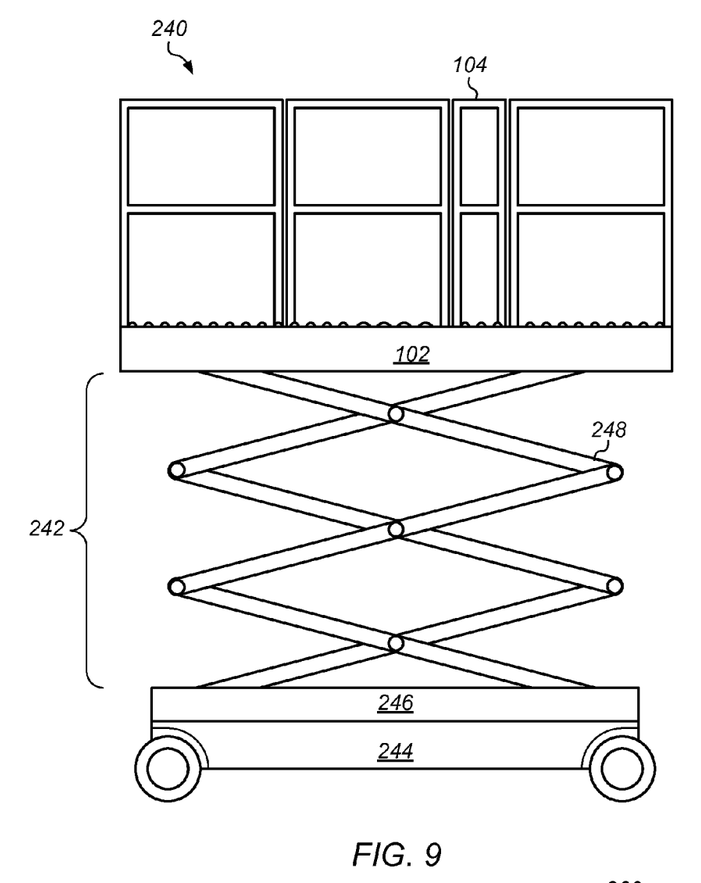
FIG. 9 illustrates one embodiment of a cart including a floor drive system and a lift mechanism.

In some embodiments, a cart includes a lift system, a tractor system, or both. FIG. 9 illustrates one embodiment of a cart including a floor drive system and a lift mechanism. System 240 includes base 102, rail system 104, lift system 242, and floor drive system 244. Lift system 242 includes lift drive mechanism 246 and scissor assembly 248. Lift drive mechanism 246 may be operated to extend and compress scissor assembly 248. Lift system 242 may be operated to raise and lower the level of base 102. Floor drive system 244 may be operated to move cart 240 from one location to another. In some embodiments, lift system 242 and floor drive system 244 are controlled by a computer control unit. In certain embodiments, an operator may control lift system 242 and floor drive system 244 while standing on base 102.

Figure 10:
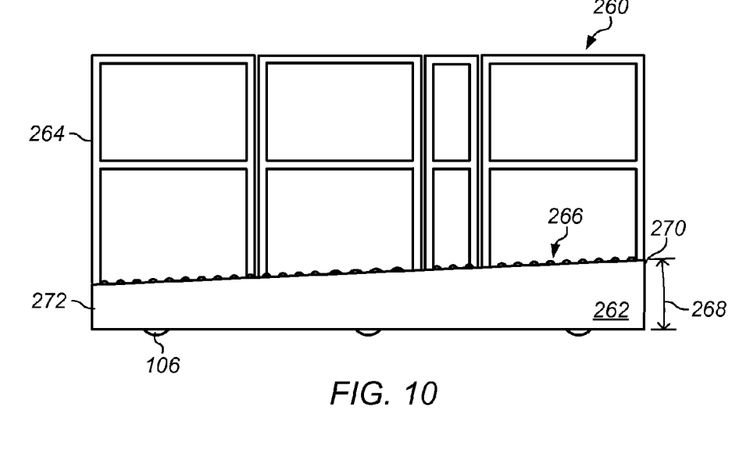
FIG. 10 illustrates one embodiment of a cart having declined upper surface rollers.

In some embodiments, rolling surfaces of a cart may be at a decline. FIG. 10 illustrates one embodiment of a cart having declined upper surface rollers. Cart 260 includes base 262, rail system 264, and rollers 266. Rollers 266 may be angle 268 relative to horizontal. As items are loaded onto the higher side of cart 260, gravity may assist an operator in moving items from higher end 270 of cart 260 to lower end 272 of cart 260. In certain embodiments, rollers 266 may be powered rollers (for example, motorized). Power rollers may be used in moving items from one area to another on the cart. In some embodiments, power rollers are used to raise items to the higher end of a cart.

Figure 11:
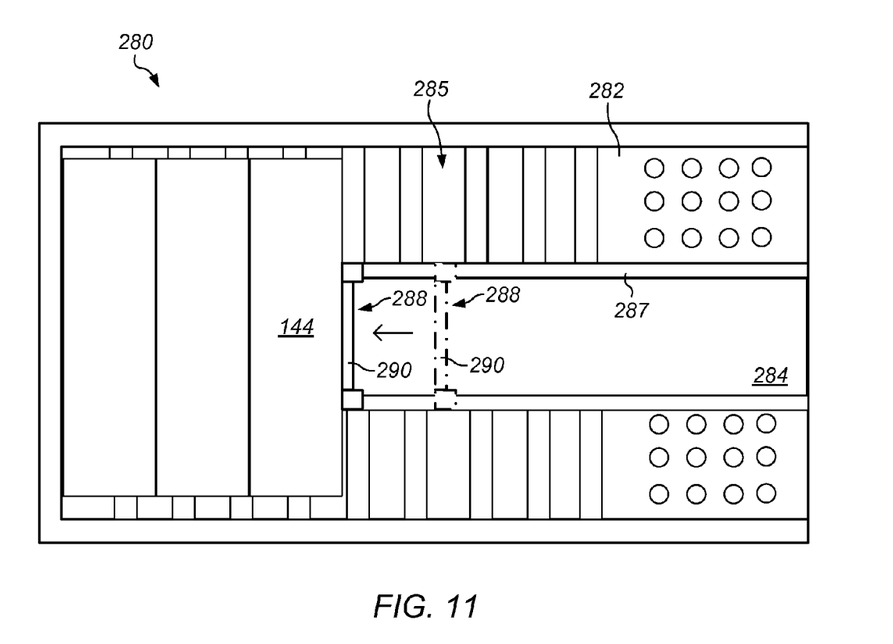
FIG. 11 illustrates one embodiment of a stop device for maintaining items in position on a cart.

In some embodiments, a cart includes one or more stop members. The stop members may keep items in place on the cart or at rest on the cart. For example, a stop member may be positioned to inhibit one or more items in a stack of items from tipping over or shifting from one location to another on the cart. In some embodiments, a stop device may be adjustable, for example, to allow the stop to be moved into position against an item to be held. FIG. 11 illustrates one embodiment of a stop device for maintaining items in position on a cart. Cart 280 includes base 282, walkway 284, roller tracks 285, stop rails 287, and stop device 288. Stop device 288 includes stop bar 290. Stop device 288 may be mounted on stop rails 287. The stop device 288 may be adjusted by sliding stop bar 290 on stop rails 287. Stop device 288 may be selectively retractable or rotatable to a position below the level of rollers 285 so that stop bar does not interfere with transfer of boxes from the loading area to the holding area of cart 280. During movement of cart 280, stop bar 290 may be deployed against the foremost box 144 on cart 280. Stop bar 290 may inhibit all of boxes 144 from shifting forward or from tipping over in cart 280.

Although in FIG. 11, a stop device is shown for illustrative purposes as a bar that slides on rails adjacent to the walkway, a stop member may have various other forms and mounting arrangements. In certain embodiments, a stop member is coupled to a side rail or end rail of a cart such that it can be slid along the rail. The stop bar can be moved (for example, flipped down into the space between the rails) into a position diagonally across a box to hold boxes in place on a cart.

In some embodiments, items are transported from one placed to another on a cart that has rollers on the upper surface of the cart in a loading area. The items may be moved out of the loading area into an unloading area on the cart. After moving the cart from a loading site to an unloading site, the items can be removed from the unloading area.

Figure 12:
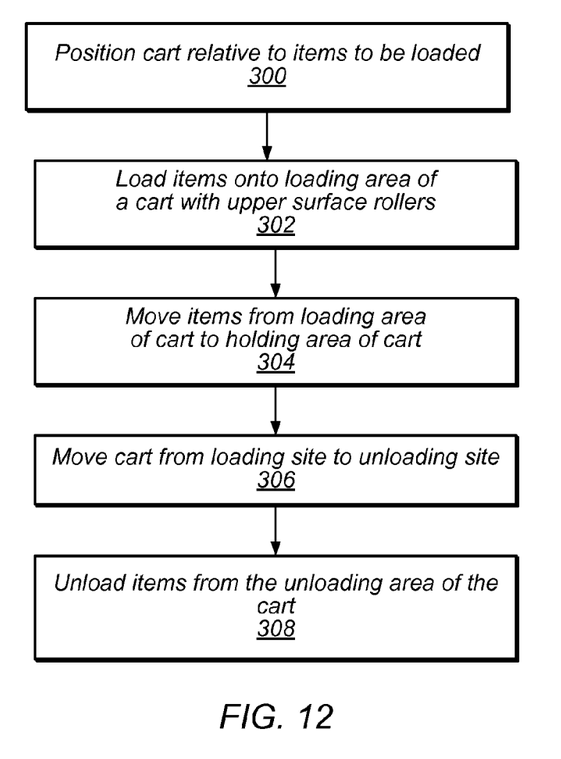
FIG. 12 illustrates one embodiment of managing inventory using a cart.

FIG. 12 illustrates one embodiment of managing inventory using a cart. At 300, a cart is positioned for loading of an item. In some embodiments, the cart may be mounted on truck and raised to a position where the platform of the cart is co-planar with a surface where the item to be moved is resting, such a warehouse shelf. Doors of the cart may be placed in appropriate positions for the load. For example, a opposite door may be closed to inhibit an item from coming off the cart on the far side of the cart. For example, loading area door 126b opposite storage rack 142 may be placed into a closed position, such as shown in FIG. 2.

At 302, an item is loaded onto a loading area of a cart. As the item is moved onto the cart, the item may be moved across one or more rollers on the cart. In some embodiments, the rollers on the cart are ball transfer devices.

At 304, the item is moved from a loading area of the cart to a holding area of the cart. In some embodiments, the item is moved across rollers as the item is shifted from the loading area to the holding area. In certain embodiments, items are loaded onto the cart in one direction and items are accumulated by moving the items in a different direction than the direction of loading. For example, as shown in FIG. 2, an item may be moved onto a cart from one side of the cart, the moved lengthwise with respect to the cart from one end of a cart to the other end.

After each item is loaded, the cart is moved to the next pickup location. In some embodiments, the cart is moved by controlling a drive system, such a drive system on an order picker or fork lift. The cart may be moved from location to location to pick up successive items, and each item loaded onto the cart. In some embodiments, one person transfers the items onto the cart. In other embodiments, a team of two or more persons loads items onto the cart.

In some embodiments, a loader/operator alternately moves between a cart walkway during item picking. For example, the loader may stand on the order picker control platform to move the cart into position for each item, and then step onto the walkway to load each item.

After each item is loaded onto the cart, the item may be shifted from the loading area on the cart to a holding area in the cart. In some embodiments, items are accumulated in one or more rows of items in a horizontal "stacking" arrangement. In certain embodiments, items are accumulated in two or more columns of items (for example, one column of items on each roller track shown in FIG. 1). In some embodiments, a stop device adjusted and deployed after each item is loaded to inhibit movement of the items as the cart is moved from location to location.

Once all of the items have been loaded onto the cart, the cart may be moved to an unloading site at 306. Any doors or other retaining members can be opened to allow unloading of items from the cart. At 308, items are unloaded from the cart. The unloading site may be, for example, an outbound area of a fulfillment center. Unloading destinations may include, for example, a floor, a platform, a pallet, a truck, a shipping container, or a conveyor belt. In some embodiments, the item is pushed across rollers on the cart as the item is moved off of the cart.

Figure 13:
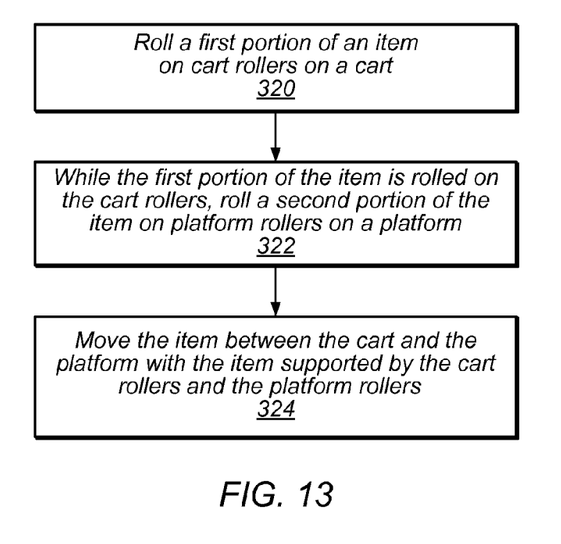
FIG. 13 illustrates one embodiment of roller-to-roller transfer of items between a cart and a platform.

In some embodiments, items are loaded onto a cart, or unloaded from a cart, by way of a roller-to-roller transfer. FIG. 13 illustrates one embodiment of roller-to-roller transfer of items between a cart and a platform. At 320, a first portion of an item is rolled on cart rollers on the cart. The item may be engaged on the cart rollers either during loading of the item onto the cart or during unloading of the item from the cart onto the platform. While the item is rolled on the cart rollers, a second portion of the item may be rolled on platform rollers on the platform at 322. At 324, the item is moved between the cart and the platform. During at least a portion of the move, the item may be partially supported on the cart rollers and partially supported on the platform rollers. In some embodiments, the item is translated across the surfaces of the cart and platform such that the item is moved without lifting the item from either the platform or the cart.

In various embodiments shown and described above, a cart has rollers for assisting in shifting items from a loading area to a holding area of a cart. A cart may, however, include in certain embodiments include other mechanisms for shifting items from one area to a cart to another. For example, a cart may include a conveyor belt mechanism for shifting items from one place to another on a cart. In certain embodiments, a powered mechanism is used to assist in loading items onto a cart, unloading items from a cart, or shifting items from one position to another on a cart.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A cart for moving items, comprising:
   a base comprising:
   one or more loading areas for loading items to be moved onto the base;
   one or more unloading areas for unloading items from the base; and
   a continuous walkway extending from a side of the base transverse to a loading or unloading side of the base and at least partially passing through at least one of the loading areas and at least partially passing through at least one of the unloading areas, wherein an end of the continuous walkway is flush with an edge of the base on the side of the base transverse to the loading or unloading side of the base, wherein the continuous walkway is configured to be walked in by personnel loading or unloading items from the base;
   a plurality of rollers coupled on one or more upper surfaces of the base in at least one of the loading areas, wherein the rollers are configured to at least partially support items as the items are loaded onto the base, wherein the one or more rollers are not present in the continuous walkway, and wherein the width of the continuous walkway is wider than the greatest distance between adjacent rollers in the at least one of the loading areas on a first side of the continuous walkway and is wider than the greatest distance between adjacent rollers in the at least one of the loading areas on a second side of the continuous walkway; and
   one or more wheels coupled to the base.

2. The cart of claim 1, wherein at least some of the rollers in at least one of the loading areas are configured to roll in two or more horizontal directions.

3. The cart of claim 2, wherein at least some of the rollers in at least one of the loading areas comprise ball transfer devices.

4. The cart of claim 1, further comprising one or more tracks of rollers configured to support items being shifted out of the loading area to another area on the cart.

5. The cart of claim 1, further comprising one or more item-retaining portions coupled to the base.

6. The cart of claim 1, further comprising one or more item holding areas, wherein at least some of the rollers are configured to support items on the cart as the items are moved from the loading area to the holding area.

7. The cart of claim 1, further comprising one or more rollers configured to support items as the items are unloaded from the cart.

8. A system for managing inventory of physical items, comprising:
   a cart comprising:
   a base comprising one or more loading/unloading areas for loading or unloading items to be moved;
   a continuous walkway extending from a side of the base transverse to a loading/unloading side of the base and at least partially passing through at least one of the loading/unloading areas, wherein an end of the continuous walkway is flush with an edge of the side of the base transverse to the loading/unloading side of the base, wherein the continuous walkway is configured to be walked in by personnel loading or unloading items from the base;
   a plurality of rollers coupled on one or more upper surfaces of the base in at least one of the loading/unloading areas on the base, wherein the rollers are configured to at least partially support items as the items are loaded onto the base or unloaded from the base, wherein the one or more rollers are not present in the continuous walkway, and wherein the width of the continuous walkway is wider than the greatest distance between adjacent rollers in the at least one of the loading/unloading areas on a first side of the continuous walkway and is wider than the greatest distance between adjacent rollers in the at least one of the loading/unloading areas on a second side of the continuous walkway.

9. The system of claim 8, wherein at least some of the rollers in at least one of the loading/unloading areas are configured to roll in two or more horizontal directions.

10. The system of claim 9, wherein at least some of the rollers in at least one of the loading areas comprise spherical rollers.

11. The system of claim 8, wherein the cart further comprises one or more tracks of rollers configured to support items being shifted out of the loading area to another area on the cart.

12. The system of claim 8, the rollers on the first side of the continuous walkway and the rollers on the second side of the continuous walkway are configured to support items being shifted out of the loading area to another area on the cart.

13. The system of claim 8, wherein the rollers are configured to support items as the items are accumulated into at least one horizontal row on the base.

14. The system of claim 8, wherein the one or more loading/unloading areas comprise:
   one or more loading areas;
   one or more unloading areas; and
   one or more rollers between the loading area and the unloading area, wherein at least some of the rollers are configured to support items as they are transferred from at least one of the loading areas to at least one of the unloading areas.

15. The system of claim 8, wherein the cart further comprises one or more item holding areas, wherein at least some of the rollers are configured to support items on the cart as the items are moved from at least one loading area into the holding area.

16. The system of claim 8, wherein the cart further comprises one or more item holding areas, wherein at least some of the rollers allow items to be rolled onto the cart in a first horizontal direction and allow the items to be rolled to the holding area in a horizontal direction that is different from the first horizontal direction.

17. The system of claim 8, wherein the cart further comprises:
   one or more item holding areas, wherein at least one of the holding areas is at a decline relative to at least one of the loading areas.

18. The system of claim 8, further comprising one or more rollers configured to support items as the items are unloaded from the cart.

19. The system of claim 8, wherein the cart further comprises one or more item-retaining portions coupled to the base.

20. The system of claim 19, wherein at least one of the one or more item-retaining portions comprises one or more doors configured to allow items to be unloaded from the cart.

21. The system of claim 19, wherein at least one of the one or more item-retaining portions comprises at least one door configured to inhibit items from coming off one side of the cart when the item is being loaded from the other side of the cart.

22. The system of claim 8, further comprising a lift truck configured to couple with the cart and raise the base.

23. The system of claim 22, wherein the lift truck comprises a control platform adjacent to the cart on the side of the base transverse to the loading/unloading side of the base, wherein the control platform is flush with the continuous walkway.

24. The system of claim 8, wherein the cart comprises a motor configured to move the cart from one location to another.

25. The system of claim 8, further comprising a lift mechanism configured to raise the base.

26. The system of claim 8, further comprising one or more storage racks, wherein the cart is configured to receive items from the one or more storage racks.

27. The system of claim 26, wherein each of the one or more storage racks comprises one or more rollers configured to support items in the rack, wherein at least some of the rollers on the cart and at least some of the rollers on the rack are configurable to support an item as the item is transferred from the rack to the cart.

28. The system of claim 8, further comprising a processing platform configured to receive items unloaded from the cart, wherein the cart further comprises one or more rollers configured to support items as the items are unloaded from the cart, wherein the processing platform comprises one or more rollers on the processing platform, wherein at least some of the rollers on the cart and at least some of the rollers on the rack are configured to cooperate to at least partially support an item as the item is unloaded from the cart onto the processing platform.

29. The system of claim 8, further comprising a stop device configured to inhibit movement of items in the holding area, wherein in the stop device is adjustable to two or more positions relative to the base.

\* \* \* \* \*